United States Patent [19]

Shimoyoshi et al.

[11] Patent Number: 5,983,175
[45] Date of Patent: Nov. 9, 1999

[54] AUDIO CODING METHOD

[75] Inventors: Osamu Shimoyoshi; Kyoya Tsutsui, both of Kanagawa, Japan

[73] Assignee: Sony Corporation, Tokyo, Japan

[21] Appl. No.: 08/738,539

[22] Filed: Oct. 28, 1996

[30] Foreign Application Priority Data

Nov. 10, 1995 [JP] Japan ..................................... 7-293020

[51] Int. Cl.⁶ .................................................. H04N 7/50
[52] U.S. Cl. ........................... 704/230; 704/219; 704/220
[58] Field of Search .................................... 704/230, 219, 704/220

[56] References Cited

U.S. PATENT DOCUMENTS

| | | | |
|---|---|---|---|
| 3,801,737 | 4/1974 | Komura | 178/6 |
| 5,338,923 | 8/1994 | Grieu | 395/775 |
| 5,339,314 | 8/1994 | Tanaka | 370/13 |
| 5,502,494 | 3/1996 | Auld | 348/426 |
| 5,636,279 | 6/1997 | Katta | 380/20 |
| 5,696,558 | 12/1997 | Tsukamoto | 704/229 |

FOREIGN PATENT DOCUMENTS

WO 94/28633  12/1994  WIPO ............................. H03M 7/30

OTHER PUBLICATIONS

R.E. Crochiere et al., "Digital Coding of Speech In Sub–Bands," The Bell System Technical Journal, vol. 55, No. 8, Oct. 1976, pp. 1069–1085.

J. Rothweiler, "Polyphase Quadrature Filters—A New Subband Coding Technique," ICASSP Proceedings, Apr. 14–16, 1983, vol. 3 of 3, pp. 1280–1283.

J. Princen et al., "Subband/Transform Coding Using Filter Bank Designs Based On Time Domain Aliasing Cancellation," ICASSP Proceedings, Apr. 6–9, 1987, vol. 4, pp. 2161–2164.

R. Zelinski et al., "Adaptive Transform Coding of Speech Signals," IEEE Transactions On Acoustics, Speech and Signal Proceedings, vol. ASSP–25, No. 4, Aug. 1977, pp. 299–309.

M. Krasner, "The Critical Band Coder–Digital Encoding of Speech Signal Based On The Perceptual Requirements of The Auditory System," IEEE, Apr. 1980, vol. 1–3, pp. 327–331.

D. Huffman, "A Method For The Construction of Minimum–Redundancy Codes," Proceedings of The I.R.E., vol. 40, Sep. 1952, pp. 1098–1101.

*Primary Examiner*—David R. Hudspeth
*Assistant Examiner*—Daniel Abebe
*Attorney, Agent, or Firm*—Limbach & Limbach LLP

[57] ABSTRACT

Coding of a high efficiency is achieved without increasing the scale of a code train transform table. Quantization spectra are divided into groups, and when two quantization spectra in any group are both equal to 0, they are coded into 0. If the two quantization spectra are not equal to 0, for example, the values (–2, 3) of the individual quantization spectra are coded into corresponding values (1101, 1110) and 1 is added to the top (or start) of the code train.

26 Claims, 10 Drawing Sheets

AUDIO CODING METHOD

FIELD OF THE INVENTION

This invention relates to an information coding apparatus and method, an information decoding method and apparatus, and an information recording medium, and more particularly to an information coding apparatus and method, an information decoding method and apparatus, and an information recording medium suitable for use to code input digital data by high efficiency coding and transmit, record, reproduce and decode the coded digital data to obtain a reproduction signal.

BACKGROUND OF THE INVENTION

Variable methods for high efficiency coding of an audio or speech signal are available. For example, subband coding (SBC) is a non-blocking frequency band dividing method wherein an audio signal or a like signal on the time base is not blocked but is divided into and coded in a plurality of frequency bands. Transform coding is a blocking frequency band dividing method wherein a signal on the time base is transformed (spectrum transformed) into another signal on the frequency base and divided into a plurality of frequency bands and then coded for each frequency band.

Also a method for high frequency coding which includes a combination of the subband coding and the transform coding described above is available. In this method, band division is first performed by subband coding, and then signals in each band are spectrum transformed into signals on the time base, whereafter coding is performed for the spectrum transformed signals for each band. For example, a quadrature mirror filter can be used as a filter for the band division mentioned above. The quadrature mirror filter is disclosed, in R. E. Crochiere, "Digital coding of speech in subbands", Bell Syst. Tech. J., Vol. 55, No. 8, 1976.

Meanwhile, a filter dividing method having subbands of equal bandwidths is disclosed in Joseph H. Rothweiler, "Polyphase Quadrature filters—A new subband coding technique", ICASSP 83, BOSTON. Here, as the spectrum transform mentioned above, a spectrum transform is performed on an input audio signal. The input audio signal is blocked with a predetermined unit time (frame). A discrete Fourier transform (DFT), discrete cosine transform (DCT) or modified discrete cosine transform (MDCT) is performed for each block to transform the input audio signal of time base into a frequency base signal. The MDCT is disclosed in J. P. Princen and A. B. Bradley, "Subband/Transform Coding Using Filter Bank Designs Based on Time Domain Aliasing Cancellation", Univ. of Surrey Royal Melbourne Inst. of Tech., ICASSP, 1987.

By quantizing signals divided into subbands by a filter or spectrum transform in this manner, subband quantization noise can be controlled. In addition higher efficiency coding can be achieved by making use of masking effects. Specifically normalization is performed for each band before quantization. If the normalization is based upon a maximum value from among absolute values of signal components in the band, higher efficiency coding can be anticipated.

Division of the frequency band is performed taking the auditory sense characteristic of the human being into consideration. In particular, an audio signal is frequency divided into a plurality of bands (for example, 25 bands) whose bandwidth increases as the frequency increases up to a high frequency band normally called the critical band. Further, coding is performed with predetermined bit allocation for the individual bands or with adaptive bit allocation for the individual bands.

For example, coefficient data obtained by the MDCT processing mentioned above are coded with an adaptive allocation bit number. The following two methods are known for the bit allocation.

The first method is disclosed in R. Zelinski and P. Noll, "Adaptive Transform Coding of Speech Signals", IEEE Transactions of Acoustics, Speech, and Signal processing, Vol. ASSP-25, No. 4, August 1977. Here, bit allocation is performed based on the magnitude of a signal for each band. With this method, flat quantization noise spectra are obtained and the noise energy is minimized. However, since the masking effects of an auditory sense are not utilized, the actual noise feeling perceived by a human being is not optimum.

The second method is disclosed in M. A. Kransner, "The critical band order-digital encoding of the perceptual requirements of the auditory system", ICASSP, MIT, 1980. The document recites a method performing fixed bit allocation wherein auditory sense masking is utilized to obtain a required signal to noise ratio for each band. With the method, however, even when a characteristic value is measured with a sine wave input, since the bit allocation is fixed, the characteristic value does not exhibit a very good value.

In order to solve these problems, a high efficiency coding apparatus has been proposed wherein all available bits are divided into bits which are used for a fixed bit allocation pattern determined in advance for each subblock and bits which are used for bit allocation which relies upon the magnitude of a signal of each block. The dividing ratio between them is determined based upon the input signal so that the number of bits allocated to the fixed bit pattern is increased as the spectra of the signals mentioned above become smoother.

With the apparatus described above, when energy is concentrated in a particular spectrum such as when a sine wave is inputted, a comparatively large number of bits are allocated to the block which includes the spectrum. Accordingly, the overall signal to noise ratio characteristic can be improved remarkably. Generally, since the auditory sense of the human being is very sensitive to a signal having a steep spectral component, improvement of signal to noise ratio by employment of such a method as described above also improves the sound quality perceived by the auditory sense.

Many other various methods have been proposed for bit allocation, and the model regarding the auditory sense has improved. An improved coding apparatus requires higher efficiency in terms of the auditory sense.

The inventors of the present invention have proposed, in PCT application No. PCT/JP94/00880 filed on May 31, 1994 and corresponding U.S. patent application Ser. No. 08/374,518, (now U.S. Pat. No. 5,717,821) a method wherein a tonal component which is particularly important in terms of the auditory sense is separated from a spectrum signal and is coded separately from other spectrum components. By this method, an audio signal or a like signal can be coded efficiently at a high compression ratio while causing little deterioration on the auditory sense.

Where the DFT or DCT mentioned above is used as a method of transforming a waveform signal into a spectrum, M independent real number data are obtained by transformation of a time block including M samples. In order to reduce connection distortion between time blocks, M1 samples are usually overlapped with each other between two adjacent blocks. Consequently, according to the DFT or DCT, when averaged, M real number data are quantized and coded for (M−M1) samples.

On the other hand, where the MDCT mentioned above is used as a method of transforming a waveform signal into a spectrum, M independent real number data are obtained from 2M samples from which N samples are overlapped with those of each of the opposite adjacent times. Consequently, according to the MDCT, when averaged, M real number data are quantized and coded for M samples. In a decoding apparatus, inverse transform is performed for each block from codes obtained using the MDCT. Waveform elements obtained by the inverse transform are added to each other in an interfering relationship with each other to regenerate a waveform signal.

Generally, by increasing the length of a time block for transformation, the frequency resolution of spectra increases and energy is concentrated upon a particular spectrum component. Where the MDCT is used, a long block is transformed with individual halves thereof overlapped with blocks on the opposite sides. The number of spectrum signals obtained does not exhibit an increase in number with respect to the original number of time samples. Therefore coding of a higher efficiency can be performed than where the DFT or DCT is used. Further, by providing a sufficiently large overlap length between adjacent blocks, the inter-block distortion of a waveform signal can be reduced.

In order to form an actual code train, quantization accuracy information and normalization coefficient information should be coded with a predetermined bit number for each band. The normalized and quantized spectrum signal should then be coded.

A method of coding a spectrum signal which uses variable length coding such as Huffman coding is known. The Huffman coding is disclosed, for example, in David A. Huffman, "A Method for the Construction of Minimum—Redundancy Codes", Proceedings of the I.R.E., September, 1952, pp.1,098–1,101.

Also another method is known which employs a multi-dimensional variable length code by which a plurality of spectrum signals are represented collectively by a single code. Generally, in a coding method which employs a multidimensional variable length code, as the order number of the code increases, the efficiency in coding in terms of the compression efficiency increases. However, since the scale of a code train table increases progressively as the order number increases, the method gives rise to a problem in practical use. Actually, an optimum order number conforming to an object is selected taking the compression efficiency and the scale of the code train table into consideration.

Generally, in an acoustic waveform signal, energy is frequently concentrated upon a basic frequency component and frequency components which are integral multiples of the basic frequency, that is, harmonic components. Since spectrum signals around the frequencies have very low levels compared with those of harmonic components, they are quantized into 0 at a relatively high probability. In order to code such signals efficiently, spectrum signals which are quantized to 0, and which are produced in a high probability, should be coded with the least information possible. Where one-dimensional variable length codes are used, even if each spectral signal is coded with one bit which is the smallest code length, N-bits are required for N spectra. Where a multidimensional variable length code of the order number N is used, since N spectra can be coded with one bit of the smallest code length, efficient coding can be performed for signals having such frequency components as described above.

However, while increasing the order number of codes acts considerably advantageously in terms of the compression efficiency, where practical use is taken into consideration, it is impossible to increase the order number indefinitely.

Normally, a code train table is prepared for the quantization accuracy set for each band. Where the quantization accuracy is low, since the number of values of spectrum signals which can be represented is small, even if the order number is increased, the scale of the code train table is not increased very much. However, where the quantization accuracy is high, the number of values of spectrum signals which can be represented is larger. Therefore, even if the order number is increased by only one, the scale of the code train table is increased remarkably.

This will be described in more detail using a concrete example. Now, it is assumed that an input signal is MDCT transformed to obtain such spectra as seen in FIG. 1. In FIG. 1, absolute values of spectra of the MDCT are converted in level into dB values and indicated on the axis of ordinate. The axis of abscissa indicates the frequency, and an input signal is transformed into 32 spectrum signals taking a predetermined time as a block. The spectrum signals are divided into 6 coded units denoted by [1] to [6] in FIG. 1. Each coded unit includes a plurality of spectra, and normalization and quantization are performed for each coded unit.

By varying the quantization accuracy for each coded unit depending upon the distribution of frequency components, coding which minimizes the deterioration in sound quality and is efficient in terms of the auditory sense can be performed. The quantization accuracy required for each coded unit can be obtained by calculating a minimum audible level or a masking level in a band corresponding to each coded unit based on an auditory sense model. Each normalized and quantized spectrum signal is transformed into a variable length code and is coded together with the quantization accuracy information and normalization information for each coded unit.

Table A illustrates a method of representation when quantization accuracy information is transmitted. Where a quantization accuracy information code is represented with 3 bits, eight different kinds of quantization accuracy information can be set. In the example illustrated, quantization is performed with one of 8 different step numbers of one step, 3 steps, 5 steps, 7 steps, 15 steps, 31 steps, 63 steps and 127 steps.

Here, quantization into one step signifies that spectrum signals in the coded unit are all quantized into the value of 0.

FIG. 2 is a diagrammatic view illustrating a variable length coding method which has ordinarily been performed. Spectrum signals are quantized with quantization accuracy information determined for each coded unit to obtain quantization spectra. Quantization spectra are transformed into a corresponding code train by referring to such a code train table as shown as table B.

Referring to FIG. 2, for the coded unit [1], for example, a code 011 is selected as the quantization accuracy information. Accordingly, quantization is performed with 7 step numbers as seen from Table B, and the values of the quantized spectrum signals are, in order from the lower frequency side, −1, 3, 0, 1. Here, it is to be noted that the level of each spectrum signal is represented by an absolute value.

If the spectrum signals are transformed into code trains using the code train table portion of the table B wherein the quantization accuracy information code is 011, then digit data of 101, 1110, 0, 100 are obtained, respectively. Thus, they have the code lengths of 3, 4, 1 and 3, respectively.

Meanwhile, for the coded unit [2], another code 010 is selected as the quantization accuracy information. In this instance, quantization is performed with five different step numbers as seen from Table B. As code trains which can be used here, five different digit data of 111, 101, 0, 100 and 110 have the smallest word length. This is because, for example, if code trains 10, 11, 0, 01 and 101 are used, then when 0101001 is received as a code train, it cannot be distinguished whether it is 0, 101, 0, 01 or 01, 0, 10, 01 or else 01, 01, 0, 01. Accordingly, it must be noticed that there are limitations to code trains which can be used.

Where the quantization accuracy information code is 010, the values of quantized spectrum signals are, in order from the lower frequency side, 0, −2, 1, 0. If they are transformed into code trains using the code train table portion of the table B wherein the quantization accuracy information code is 010, then the spectrum signal values are 0, 111, 100, 0, and they have code lengths of 1, 3, 3, 1, respectively.

As seen from Table B, code trains are prepared by a number equal to the quantization step number. Accordingly, for example, where the quantization accuracy information code is 111, 127 different code trains are prepared. Consequently, a total of 252 different code trains are prepared.

Similarly, for the coded unit [3], a further code 001 is selected as the quantization accuracy information, and quantization is performed with three different step numbers. Thus, the quantization spectra are 0, −1, 0, 0, the code trains are 0, 11, 0, 0, and the code lengths are 1, 2, 1, 1.

FIG. 3 illustrates a two-dimensional variable length coding method. The two-dimensional code train table as seen in Table C is used when the quantization accuracy information code is 001. The quantization spectra of each of coded units [1], [2] and [3] shown in FIG. 3 are collected two by two into a group which is transformed into one code train. Accordingly, quantized spectra 0, −1, 0, 0 of the coded unit [3] are collected as (0, −1) and (0, 0) and transformed into two code trains of 101, 0.

Where the quantized spectra 0, −1, 0, 0 of the coded unit [3] are coded into one-dimensional variable length codes as seen in FIG. 2, the required information amount is 1+2+1+1=5 bits. In contrast, if they are coded into two-dimensional variable length codes as seen in FIG. 3, then the information amount is 3+1=4 bits. Thus, it can be seen that use of two-dimensional variable length coding can allow coding with a reduced information amount.

As described above, by coding two quantized spectra into one variable length code in accordance with a code train table, the code length can be decreased compared with that where a one-dimensional variable length code is used.

However, if a plurality of (N) quantized spectra are collected into one group to obtain N-dimensional data and code the N-dimensional data into a variable length code then a very large scale code train table is required. This makes it difficult to put the coding apparatus into practical use.

For example, the quantized spectra of the coded unit [3] shown in FIG. 3 may be collected into one group. Accordingly $3^4$, (or 81) code trains are required.

SUMMARY OF THE INVENTION

It is an object of the present invention to provide an audio coding method which allows coding with a comparatively small code length without increasing the scale of a code train table.

According to an aspect of the present invention, there is provided an information coding apparatus wherein a plurality of data are divided into units and the data are transformed into codes of digit data for each of the units. The information coding apparatus comprises a discrimination means for discriminating a pattern of information for each of the groups. The information coding apparatus also comprises a coding means for coding. When the information of any group is information of a particular pattern, the coding means codes the group into a shortest code. When the information of the group is information other than the information of the particular pattern, the coding means codes pieces of the information of the group into corresponding codes. The coding means allocating a code of the length of one bit to each group of the information of the particular pattern to code the information of the group. The coding means codes pieces of the information of any other group into a code train including a code of one bit at the top of the code train and codes corresponding to the pieces of information.

According to another aspect of the present invention, there is provided an information coding method wherein a plurality of data are divided into units and the data are transformed into codes of digit data for each of the units. The method comprises the steps of discriminating a pattern of information for each of the groups. The method also comprises coding, when the information of any group is information of a particular pattern, the group into a shortest code. When the information of the group is information other than the information of the particular pattern, the method codes pieces of the information of the group into corresponding codes. The coding step allocates a code of the length of one bit to each group of the information of the particular pattern to code the information of the group. The coding step codes pieces of the information of any other group into a code train including a code of one bit at the top of the code train and codes corresponding to the pieces of information.

With the information coding apparatus and the information coding method of the present invention, when information of a group is information of a particular pattern, the group is coded into a shortest code, but when the information of the group is information other than the information of the particular pattern, pieces of the information of the group are coded into individually corresponding codes. Consequently, coding of a high efficiency can be achieved without increasing the scale of a code train table.

According to a further aspect of the present invention, there is provided an information coding apparatus wherein a plurality of data are divided into units and the data are transformed into codes of digit data for each of the units. The information coding apparatus comprises a division means for dividing signals into predetermined coded units. The information coding apparatus also comprises a decision means for deciding quantization accuracy information for each of the coded units. The information coding apparatus also comprises a quantization means for quantizing the signals in response to the quantization accuracy information. The information coding apparatus also comprises a coding means for coding each signal using a coding method corresponding to the quantization accuracy information. The coding means decomposes the signals into groups. If the quantization accuracy is high when the signals of any group are signals of a particular pattern, the coding means codes the group into a shortest code, but when the signals of the group are any other signals than the signals of the particular pattern, the coding means codes the signals of the group into corresponding code trains.

According to a still further aspect of the present invention, there is provided an information coding method wherein a plurality of data are divided into units and the data are transformed into codes of digit data for each of the units. The information coding method comprises the steps of dividing signals into predetermined coded units. The information coding method also comprises deciding quantization accuracy information for each of the coded units. The information coding method also comprises quantizing each of the signals in response to the quantization accuracy information. The information coding method also comprises coding each of the signals using a coding method corresponding to the quantization accuracy information.

With the information coding apparatus and the information coding method of the present invention, since a signal is coded using a coding method corresponding to the quantization accuracy information of the signal, coding can be performed efficiently.

According to a yet further aspect of the present invention, there is provided an information decoding apparatus which decodes codes of digit data received in units of a group into a plurality of data. The information decoding apparatus comprises a discrimination means for discriminating whether or not a plurality of pieces of information of each group are information of a particular pattern. The information decoding apparatus also comprises a decoding means for decoding, when the plurality of pieces of information of any group are information of the particular pattern, codes of the group into a plurality of pieces of information of an equal value. The decoding means decodes when the plurality of pieces of information of any group are information other than the information of the particular pattern, codes of the group into individually corresponding pieces of information.

According to a yet further aspect of the present invention, there is provided an information decoding method which decodes codes of digit data received in units of a group into a plurality of data. The information decoding method comprises the step of discriminating whether or not a plurality of pieces of information of any group are information of a particular pattern. The information decoding method also comprises decoding, when the plurality of pieces of information of the group are information of the particular pattern, the codes of the group into a plurality of pieces of information having an equal value. The information decoding method also comprises decoding, when the plurality of pieces of information of the group are information other than the information of the particular pattern, the codes of the group into individually corresponding pieces of information.

With the information decoding apparatus and the information decoding method of the present invention, when a plurality of pieces of information of a group are information of a particular pattern, codes of the group are decoded into a plurality of pieces of information having an equal value, but when the plurality of pieces of information of the group are information other than the information of the particular pattern, the codes of the group are decoded into individually corresponding pieces of information. Consequently, codes of a high compression efficiency can be decoded using a code train table of a small scale.

According to a yet further aspect of the present invention, there is provided an information recording medium, on which codes obtained by coding are recorded. When a plurality of pieces of information in a group are information of a particular pattern, the plurality of pieces of information are represented by a shortest code of the group. When the plurality of pieces of information in the group are information other than the information of the particular pattern, the plurality of pieces of information are represented by a code train including a code different from the shortest code and codes corresponding to the pieces of information of the group are recorded.

With the information recording medium of the present invention, information can be recorded in a higher density than ever.

The above and other objects, features and advantages of the present invention will become apparent from the following description and the appended claims, taken in conjunction with the accompanying drawings in which like parts or elements are denoted by like reference characters.

Table A is a table illustrating a method of representing quantization accuracy information;

Table B is a table showing an example of a code train table; and

Table C is a table showing an example of a related art multidimensional code train table.

DESCRIPTION OF THE PREFERRED EMBODIMENTS

Before preferred embodiments of the present invention are described, in order to clearly indicate the corresponding relationship between means taken by the present invention as defined in the appended claims and elements of the embodiments of the present invention, several aspects of the present invention are described with reference symbols of the elements of the embodiments. It is a matter of course that it shall not be understood that the description limits the means defined in the claims to those of the embodiment.

An information coding apparatus includes discrimination means (for example, the step S1 on the program of FIG. 9) for discriminating a pattern of information of each of groups, and coding means (for example, the steps S2, S3 and S4 on the program of FIG. 9) for coding, when the information of any group is information of a particular pattern, the group into a shortest code, but coding, when the information of the group is information other than the information of the particular pattern, pieces of the information of the group into corresponding codes.

Figure 4:
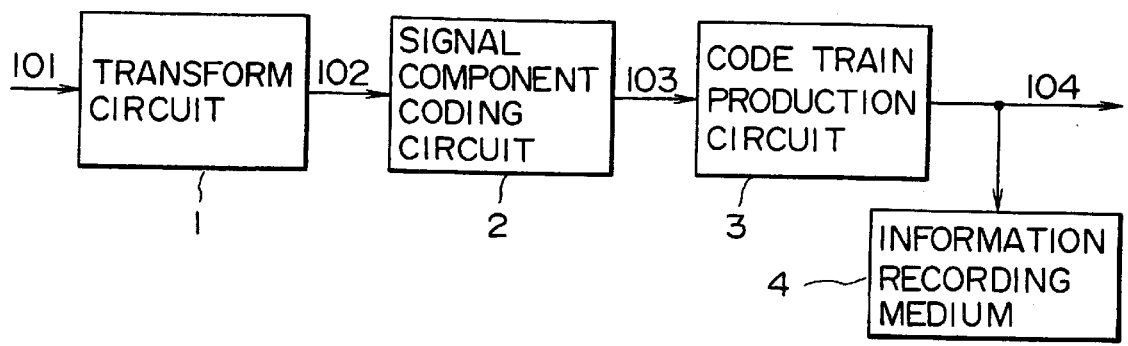
FIG. 4 is a block diagram showing a construction of a coding apparatus to which the present invention is applied.
Figure 5:
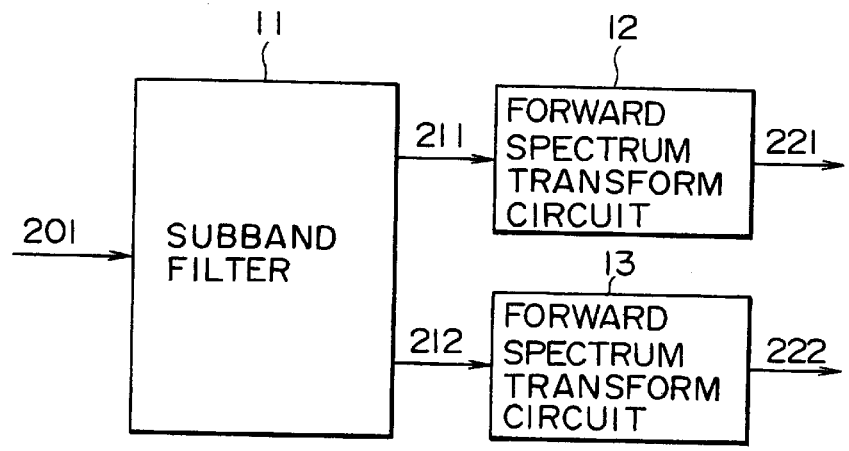
FIG. 5 is a block diagram showing a construction of a transform circuit shown in FIG. 4.
Figure 6:
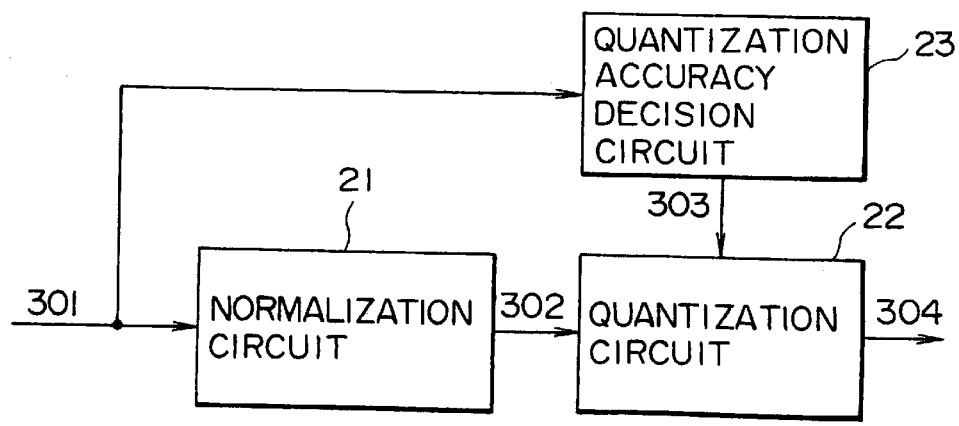
FIG. 6 is a block diagram showing a construction of a signal component coding circuit shown in FIG. 4.

An information coding apparatus includes division means (for example, the forward spectrum transform circuits 12 and 13 of FIG. 5) for dividing signals into predetermined coded units, decision means (for example, the quantization accuracy decision circuit 23 of FIG. 6) for deciding quantization accuracy information for each of the coded units, quantization means (for example, the quantization circuit 22 of FIG. 6) for quantizing the signals in response to the quantization accuracy information, and coding means (for example, the code train production circuit 3 of FIG. 4) for coding each signal using a coding method corresponding to the quantization accuracy information.

An information decoding apparatus includes discrimination means (for example, the step S11 on the program of FIG. 10) for discriminating whether or not a plurality of pieces of information of each group are information of a particular pattern, and decoding means (for example, the steps S12 and S13 on the program of FIG. 10) for decoding, when the plurality of pieces of information of any group are information of the particular pattern, codes of the group into a plurality of pieces of information of an equal value, but decoding, when the plurality of pieces of information of any group are information other than the information of the particular pattern, codes of the group into individually corresponding pieces of information.

Referring to FIG. 4, there is shown in a block diagram a construction of a coding apparatus for an acoustic waveform signal to which the present invention is applied. A signal waveform 101 inputted to the coding apparatus shown is transformed into signal frequency components 102 by a transform circuit 1. The signal frequency components 102 are individually coded by a signal component coding circuit 2 to provide code signals 103. Code trains 104 are produced from the codes from the signal component coding circuit 2 by a code train production circuit 3. The code trains 104 are transmitted by a predetermined transmission line and/or recorded onto an information recording medium 4.

FIG. 5 shows an exemplary form of the transform circuit 1 of FIG. 4. Referring to FIG. 5, a signal 201 inputted to the transform circuit 1 is divided into two signal components 211 and 212 of different bands by a subband filter 11. The signal components 211 and 212 are transformed into spectrum signal components 221 and 222 by forward spectrum transform circuits 12 and 13 which perform a transformation such as MDCT, respectively. It is to be noted that the signal 201 of FIG. 5 corresponds to the signal waveform 101 of FIG. 4 and the signals 221 and 222 of FIG. 5 correspond to the signals 102 of FIG. 4.

The transform circuit 1 may have various other forms. For example, the transform circuit 1 may directly transform an input signal to spectrum signals by the DFT or DCT.

It is possible to divide a signal into band components by a subband filter without transforming the signal into spectrum signals. However, the method of the present invention acts particularly effectively where energy is concentrated upon a particular frequency. Accordingly, it is advantageous to employ a method wherein a signal is transformed into frequency components by the spectrum transform described above with which a large number of frequency components can be obtained with a comparatively small amount of calculation.

FIG. 6 shows an exemplary form of the signal component coding circuit 2 of FIG. 4. Referring to FIG. 6, each signal component 301 is first normalized for each predetermined band by a normalization circuit 21 and then inputted as a signal 302 to a quantization circuit 22. Then, the signal 302 is quantized by the quantization circuit 22 in accordance with a quantization accuracy signal 303 calculated by a quantization accuracy decision circuit 23 and is outputted as a signal 304 from the quantization circuit 22. The signal component 301 of FIG. 6 corresponds to the signal frequency components 102 of FIG. 4. The signal 304 of FIG. 6 corresponds to the code signals 103 of FIG. 4. The signal 304 (103) includes, in addition to a quantized signal component, normalization coefficient information and quantization accuracy information.

Figure 7:
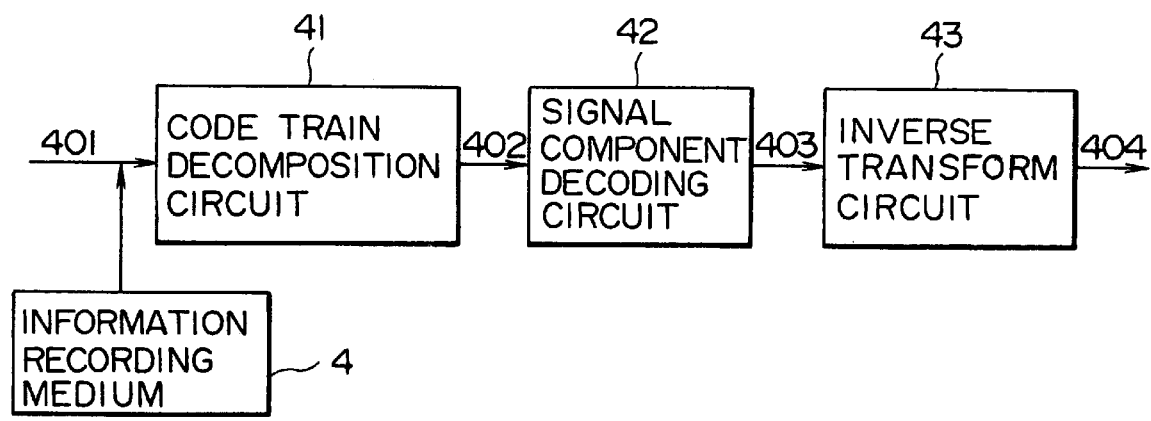
FIG. 7 is a block diagram showing a construction of a decoding apparatus to which the present invention is applied.

FIG. 7 shows in a block diagram a construction of a decoding apparatus according to the present invention which decodes and outputs an acoustic signal from a code train produced by the coding apparatus shown in FIG. 4. Referring to FIG. 7, in the decoding apparatus shown, a code train 401, which is transmitted thereto or reproduced from the information recording medium 4, is inputted to a code train decomposition circuit 41, by which codes 402 of individual signal components are extracted. The codes 402 are decoded into signal components 403 by a signal component decoding circuit 42, and an acoustic waveform signal 404 is produced from the signal components 403 by and outputted from an inverse transform circuit 43.

Figure 8:
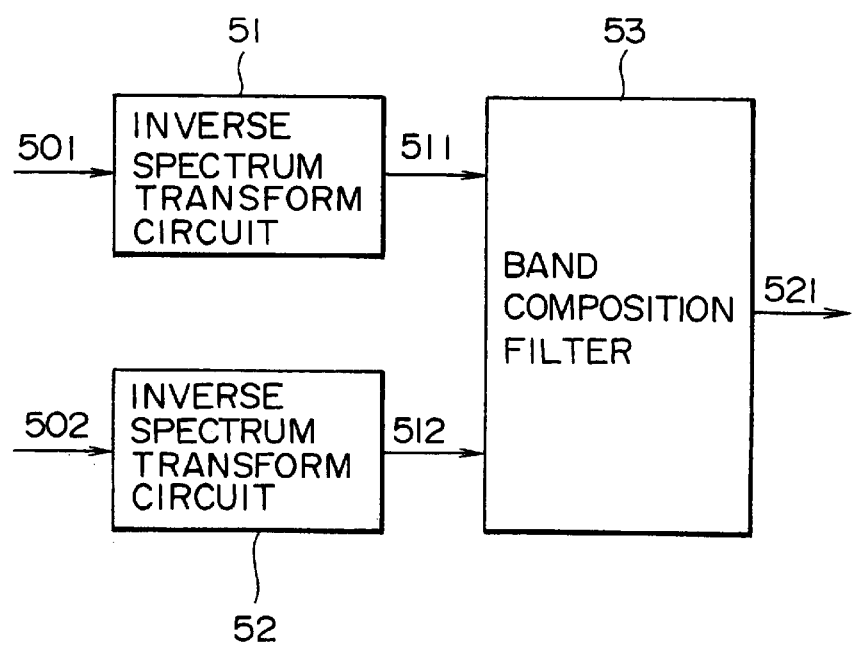
FIG. 8 is a block diagram showing a construction of an inverse transform circuit shown in FIG. 7.

FIG. 8 shows an exemplary form of the inverse transform circuit 43 of FIG. 7. Referring to FIG. 8, the inverse transform circuit 43 corresponds to the form of the transform circuit shown in FIG. 5. In particular, signals 501 and 502 are inputted to inverse spectrum transform circuits 51 and 52, by which signals 511 and 512 of different bands are obtained, respectively. The signals 511 and 512 are composed by a band composition filter 53 and outputted as a signal 521 from the band composition filter 53. The signals 501 and 502 of FIG. 8 correspond to the signal components 403 of FIG. 7, and the signal 521 of FIG. 8 corresponds to the acoustic waveform signal 404 of FIG. 7.

Subsequently, operation of the coding apparatus shown in FIGS. 4 to 6 will be described. Referring first to FIG. 5, an acoustic waveform signal 201 (101 in FIG. 4) is inputted to the subband filter 11 of the transform circuit 1 and divided into a signal component 211 of a comparatively low frequency and another signal component 212 of a comparatively high frequency by the subband filter 11. The signal component 211 of a comparatively low frequency is inputted to the forward spectrum transform circuit 12 and transformed into a spectrum signal component 221 by the forward spectrum transform circuit 12. Similarly, the signal component 212 of a comparatively high frequency is inputted to the forward spectrum transform circuit 13 and transformed into a spectrum signal component 222 by and outputted from the forward spectrum transform circuit 13.

Figure 1:
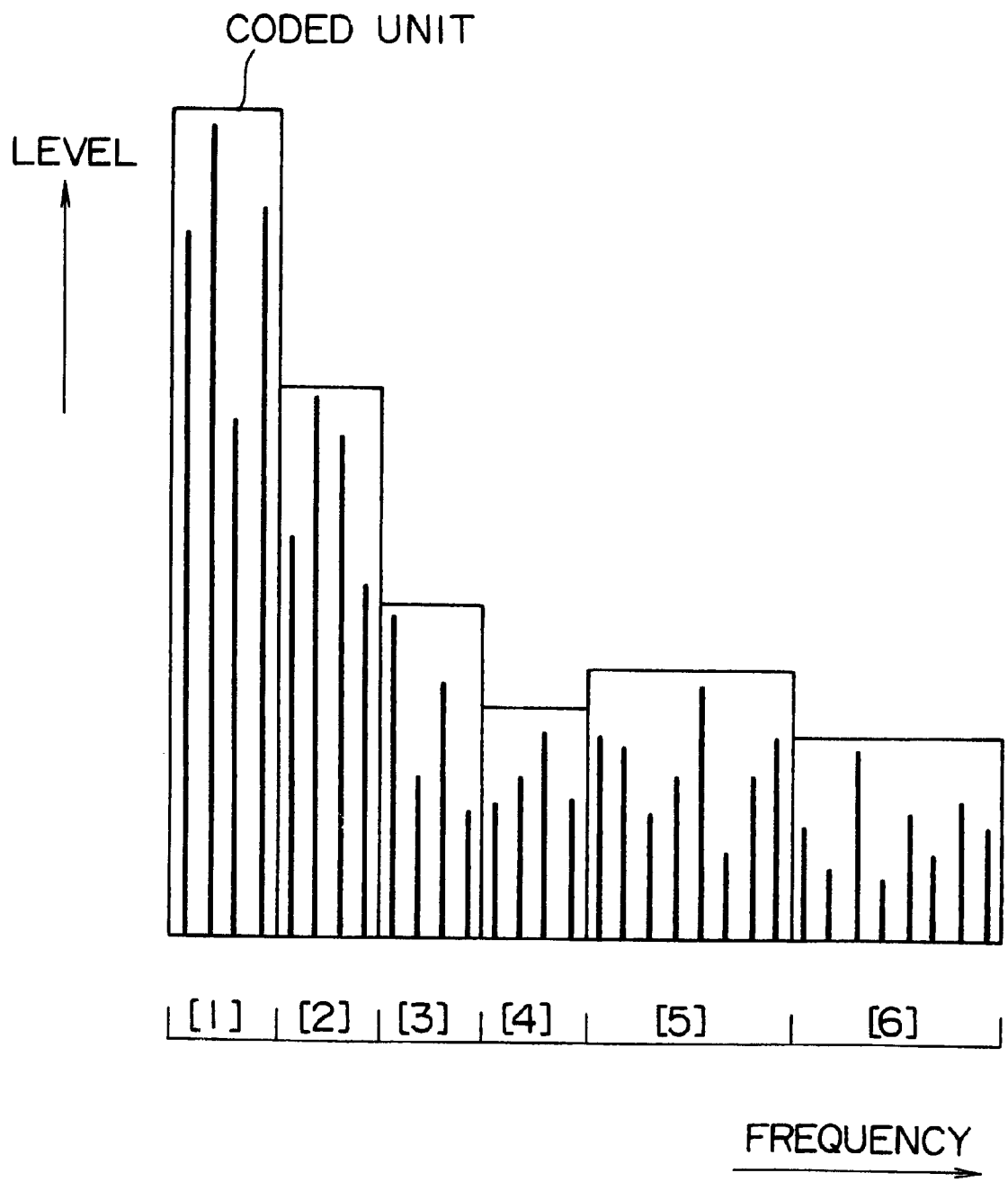
FIG. 1 is a diagrammatic view illustrating spectra of a coded unit.
Figure 2:
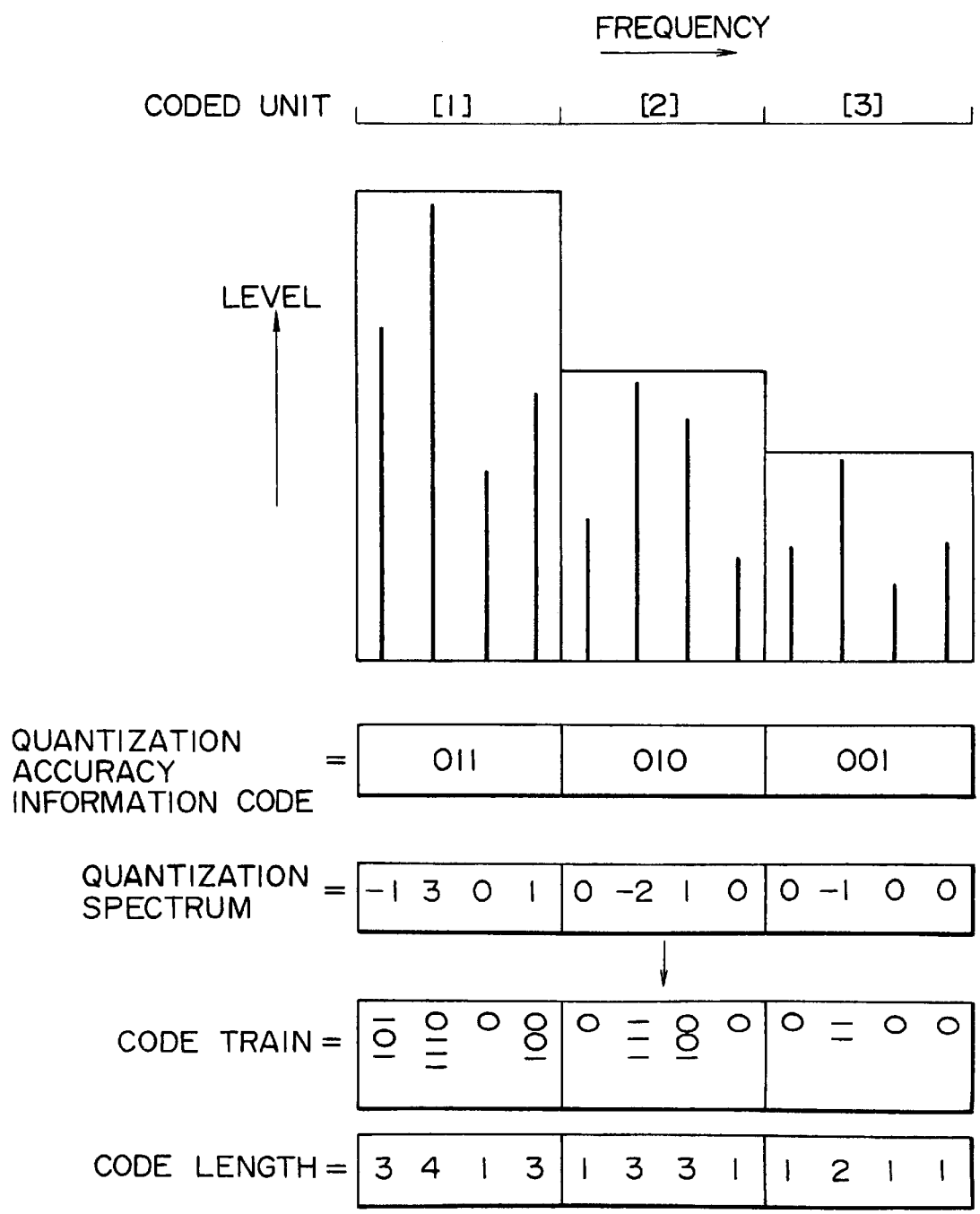
FIG. 2 is a diagrammatic view illustrating a related art coding method which employs variable length coding.
Figure 3:
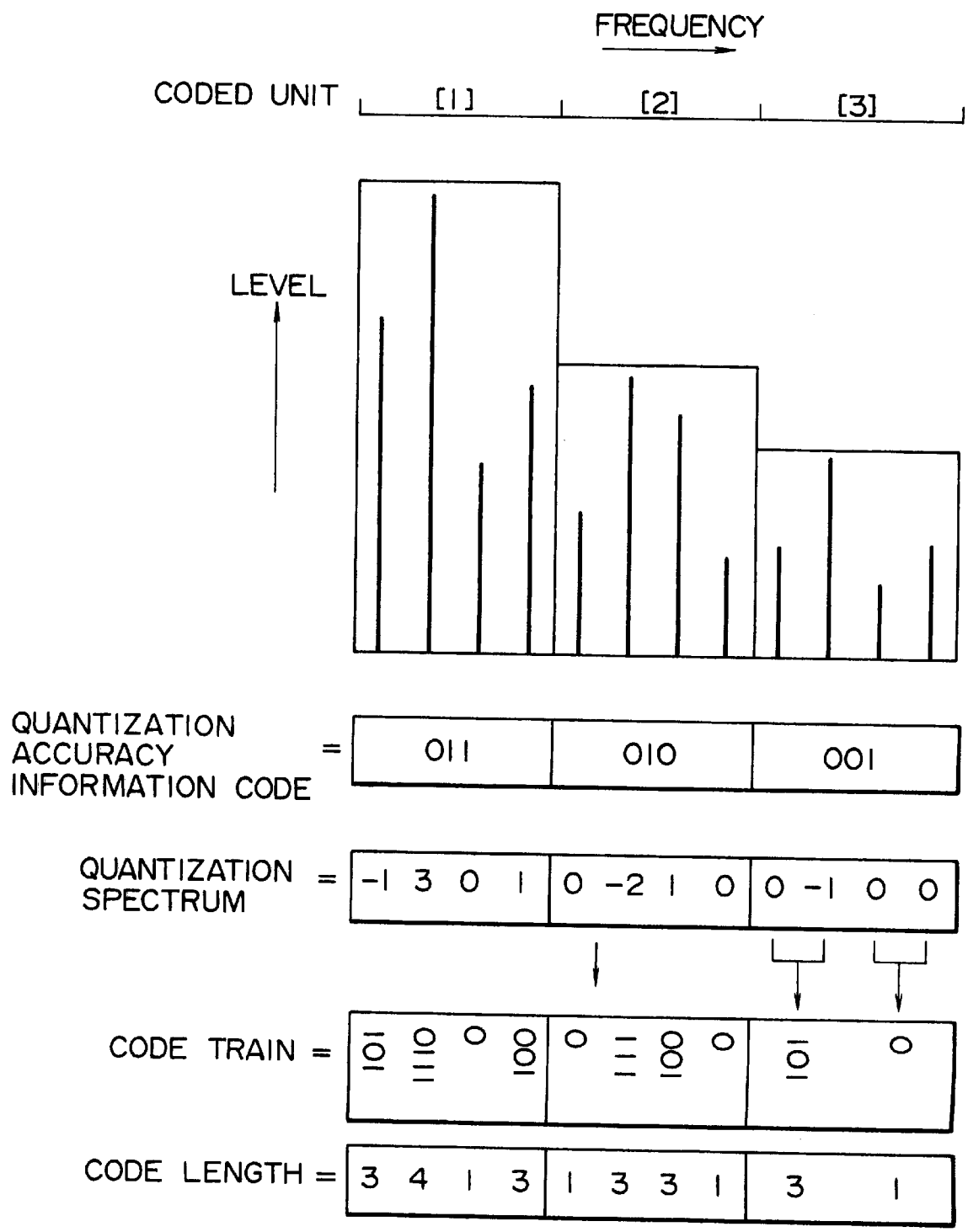
FIG. 3 is a diagrammatic view illustrating another related art coding method which employs multidimensional variable length coding.

Referring also to FIG. 1, the forward spectrum transform circuit 12 transforms spectrum signals of a comparatively low frequency into units to produce coded units [1] to [3]. Meanwhile, the forward spectrum transform circuit 13 transforms spectrum signals of a comparatively high frequency into units to produce coded units [4] to [6].

Each of the spectrum signal components 221 and 222 (102) outputted from the forward spectrum transform circuits 12 and 13 are inputted to the normalization circuit 21 and the quantization accuracy decision circuit 23 of the signal component coding circuit 2. The normalization circuit 21 divides the values of a plurality of spectrum signal components in each coded unit by a maximum value from among the values of the spectrum signal components to normalize the spectrum signal components. Then, normalization coefficients 302 obtained by the normalization are supplied to the quantization circuit 22.

The quantization accuracy decision circuit 23 calculates a minimum audible level or a masking level for a band corresponding to each coded unit to decide the quantization accuracy of the spectrum signal components inputted thereto in units of a coded unit. The quantization circuit 22 quantizes the normalization coefficients 302 supplied thereto from the normalization circuit 21 with the quantization accuracy signal 303 supplied thereto from the quantization accuracy decision circuit 23 to obtain a quantization signal 304 (103). The quantization circuit supplies the quantization signal 304 (103) to the code train production circuit 3. The code train production circuit 3 transforms the quantized spectrum signals into code trains in accordance with the process illustrated in the flow chart of FIG. 9.

Figure 9:
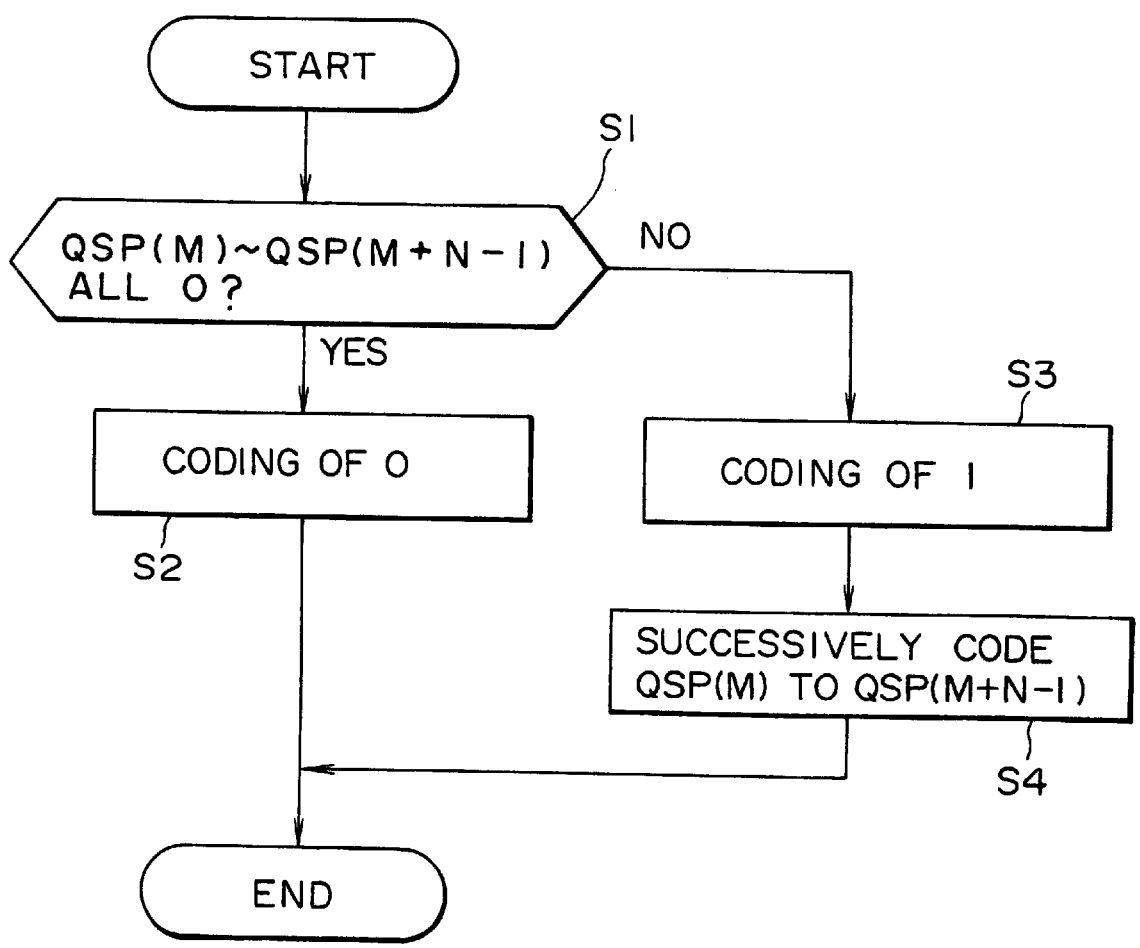
FIG. 9 is a flow chart illustrating a method of coding spectrum signals according to the present invention.

Referring to FIG. 9, reference character QSP(i) represents the quantized spectrum signals, and N represents the number of spectrum signals to be coded at a time. It can be considered that N is a value corresponding to the order number of variable length coding.

First in step S1, the values of the N quantized spectrum signals QSP(M) to QSP(M+N−1) are checked. If all of them are equal to 0, then the control sequence advances to step S2, in which 0 is coded as a code train of the N spectra. However, if any value other than 0 is detected from any of the N spectrum signals, then the control sequence advances to step S3, in which 1 is coded as a code train. Thereafter, the control sequence advances to step S4, in which the quantized spectrum signals QSP(M) to QSP(M+N−1) are successively coded. The coding of the quantized spectrum signals QSP(M) to QSP(M+N−1) is performed in a similar manner as in the related art one-dimensional coding.

Subsequently, operation of the decoding apparatus shown in FIGS. 7 and 8 will be described. A signal 401 transmitted thereto from the coding apparatus shown in FIG. 4 or reproduced from the information recording medium 4 is inputted to the code train decomposition circuit 41. The code train decomposition circuit 41 performs code train decomposition processing in such a manner as illustrated in the flow chart of FIG. 10.

Figure 10:
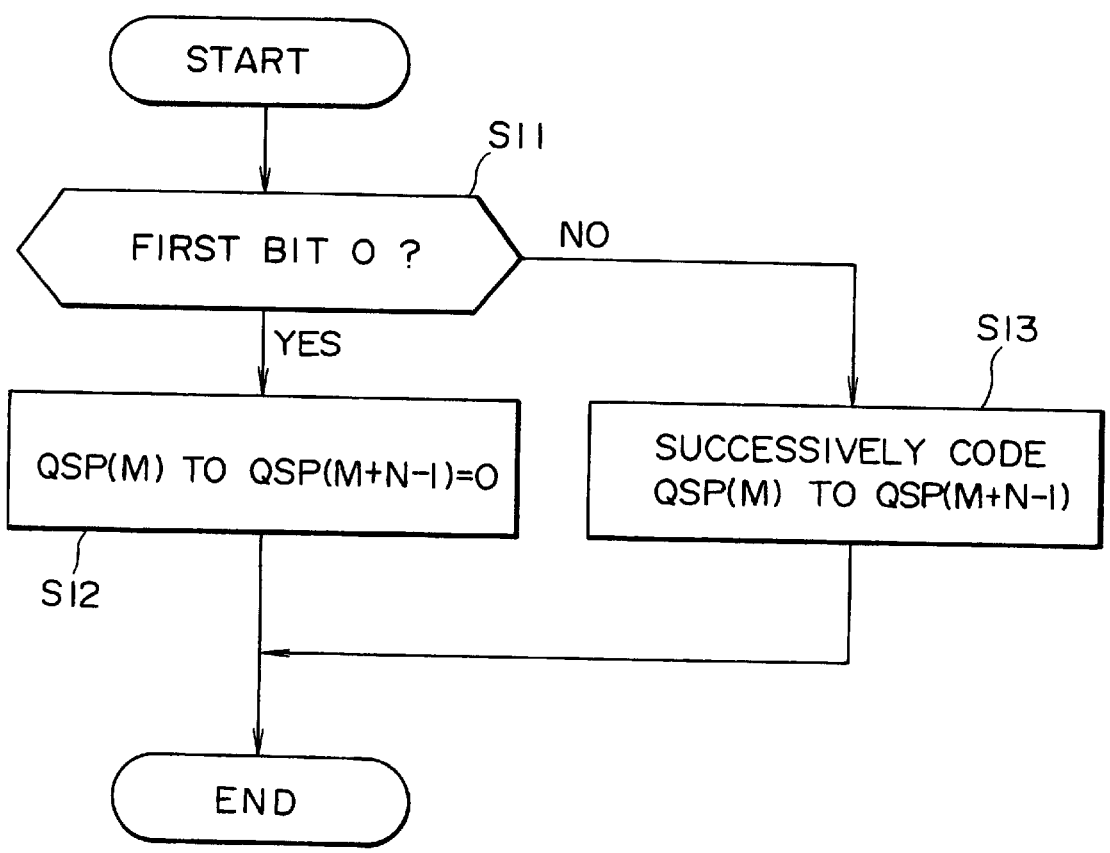
FIG. 10 is a flow chart illustrating a method of decoding spectrum signals according to the present invention.

Referring to FIG. 10, similarly as in the coding processing of FIG. 9, reference character QSP(i) represents the quantized spectrum signals, and N represents the number of spectrum signals to be decoded at a time. First, in step S11, the first bit of the coded code train is read. If the code thus read is 0, then the control sequence advances to step S12, in which the values of the quantized spectrum signals QSP(M) to QSP(M+N−1) are all set to 0. On the other hand, if it is determined in step S11 that the first bit of the coded code train is not 0, that is, when the first bit is 1, then the control sequence advances to step S13. The quantized spectrum signals QSP(M) to QSP(M+N−1) of the code train are individually and successively decoded beginning with the second bit of the code train. The decoding of the quantized spectrum signals QSP(M) to QSP(M+N−1) is performed in a manner similar to the related art one-dimensional decoding.

The signals 402 obtained by the decomposition by the code train decomposition circuit 41 in this manner are inputted to and decoded by the signal component decoding circuit 42. The signal component decoding circuit 42 performs processing inverse to that of the signal component coding circuit 2 shown in FIG. 6.

Then, one of signal components 403 outputted from the signal component decoding circuit 42 which has a comparatively low frequency, that is, the spectrum signal component 501, is inputted to the inverse spectrum transform circuit 51 while the other one of the signal components 403 which has a comparatively-high frequency, that is, the spectrum signal component 502, is inputted to the inverse spectrum transform circuit 52. The inverse spectrum transform circuits 51 and 52 transform the spectrum signal components 501 and 502 inputted thereto into acoustic signals 511 and 512 on the time base, and output the acoustic signals 511 and 512 to the band composition filter 53, respectively. The band composition filter 53 composes the acoustic signal 511 and the acoustic signal 512 into a composed acoustic signal 521 (404) and outputs the acoustic signal 521 (404).

Figure 11:
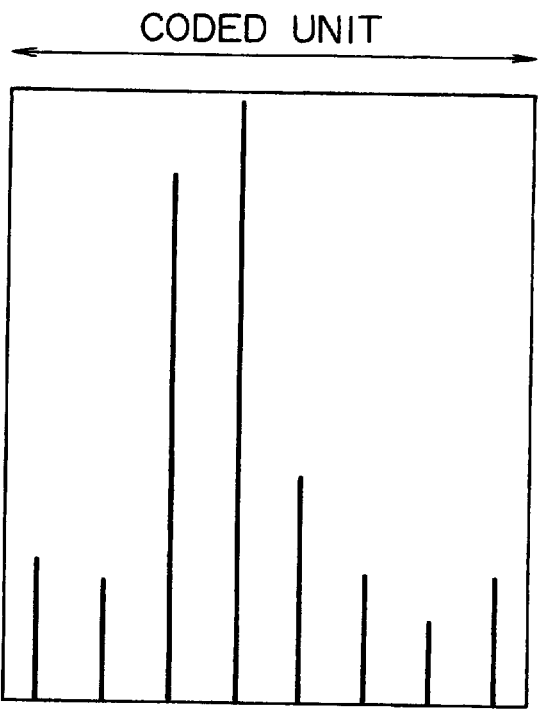
FIGS. 11 to 12 are diagrammatic views illustrating different coding methods according to the present invention.

FIG. 11 illustrates in diagrammatic view a detailed example of coding spectrum signals according to the present invention. In particular, FIG. 11 illustrates an example in which spectrum signals in one coded unit are coded. In the coding example illustrated in FIG. 11, adjacent spectrum signals are collected into groups of two and coding is performed for the groups. As can be seen in FIG. 11, if the values obtained by quantization of two adjacent spectrum signals are all equal to 0 (when the determination in step S1 is YES), then the two spectrum signals are coded into a code train of 0 (step S2). In any other case (when the determination in step S1 is NO), for example, if the values obtained by quantization of two spectrum signals are −2 and 3, then the two spectrum signals are transformed into another code train of 1 (step S3). Then, the quantization values −2 and 3 are successively coded into 1101 and 1110, respectively, using, for example, the code train table portion of Table B described hereinabove. It is considered that this realizes two-dimensional variable length coding by artificially using the one-dimensional code train table portion of Table B. As seen in FIG. 11, the code length of the coded unit is 12 (=1+1+4+4+1+1).

Figure 12:
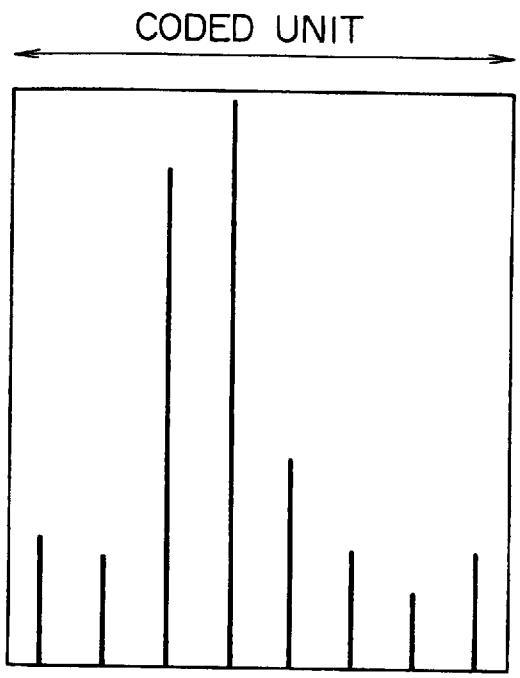

FIG. 12 similarly illustrates in diagrammatic view a manner wherein four spectra are coded collectively. Also in this instance, it is considered that four-dimensional variable length coding is realized by artificially using the one-dimensional code train table portion.

In particular, in the present coding, four quantization spectra 0, 0, −2, 3 are individually quantized into 0, 0, 1101, 1110 in accordance with the code train table portion of Table B for the quantization accuracy information code of 011 (step S4). Then, for the object of identification, 1 is added to the top (or start) of those code trains (step S3). Further, four successive quantization spectra 0, 0, 0, 0 are coded into 0 (step S2). Accordingly, the code length of the coded unit in this instance is 12 (=1+1+1+4+4+1).

Figure 13:
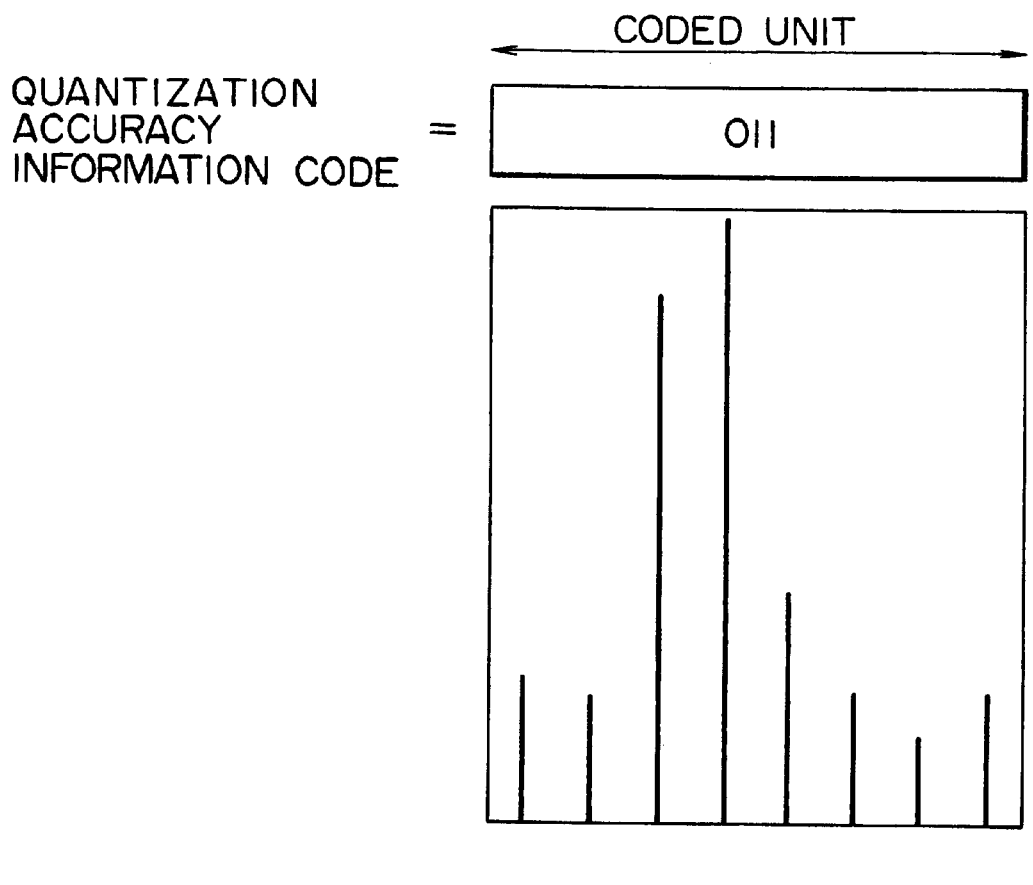
FIG. 13 is a diagrammatic view illustrating a related art coding method.
Figure 13:
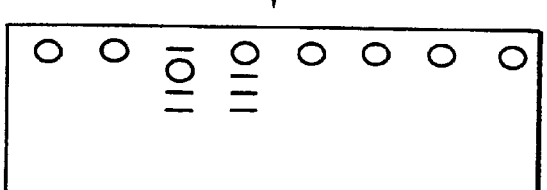
Figure 13:
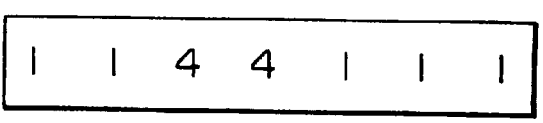

In the coding manners illustrated in FIGS. 11 and 12, spectrum signals in a coded unit are coded with an information amount of 12 bits. Here, for the sake of comparison, a manner of coding where spectrum signals are coded by a method which employs the related art one-dimensional variable length coding (a code train table portion of Table B) is illustrated in FIG. 13. As seen from FIG. 13, the information amount in this instance is 14 bits. Accordingly, it can be seen that the methods can achieve coding with a smaller amount of information.

Here, for comparison, the scale of a code train table portion, where the quantization accuracy information code of FIG. 13 is 011, produced by the related art method, is calculated. The calculation proves that, while the scale is 7 words where the one-dimensional variable length coding is employed, where the two-dimensional variable length coding is employed, a code train table portion of 49 words is required and where the four-dimensional variable coding is employed, a code train table portion of 2,401 words is required.

Generally, an acoustic waveform signal in most cases has energy concentrated upon a basic frequency and frequency components equal to integral multiples of the basic frequency, that is, harmonic components. Even if spectrum signals of frequency components other than the basic frequency and the harmonic components are quantized, the values obtained are in most cases equal to zero. As the basic frequency increases, since the interval between harmonic components increases, the probability of appearance of quantization spectra of 0 increases. Further, since a sufficient signal to noise ratio on the auditory sense cannot be assured if the quantization accuracy for signals having such frequency components is not raised to quantize them, a considerable large information amount is consumed. Particularly in a band wherein the width of a coded unit is large, the consumed information amount is large.

Thus, in order to perform coding for such signals efficiently, spectrum signals quantized to 0 are coded with a reduced information amount. As described above, the method according to the present invention realizes efficient coding without increasing the scale of a code train table.

While the embodiments described above use the band division circuit and the band composition circuit is described above, it is a matter of course that the MDCT transform or the IMDCT transform may be performed directly without using a subband filter or a band composition filter. Further, the type of spectrum transform is not limited to the MDCT, but the DFT, the DCT or some other transform may be used instead.

Further, spectrum transform need not necessarily be used. Band division or band composition may be performed only by means of a subband filter or a band composition filter. In this instance, a band obtained by division by a filter or a plurality of such divisional bands are handled as a coded unit. However, by constructing a coded unit as described hereinabove, the method of the present invention can be applied efficiently.

Further, while processing of an acoustic waveform signal is described above, the method of the present invention can be applied to different types of signals and can be applied, for example, also to a video signal. However, since the present invention makes use of a characteristic of an acoustic waveform signal to realize efficient coding where many spectrum signals are quantized to 0, the method of the present invention is especially effective where it is used for an acoustic waveform signal.

Further, the method of the present invention can be used in combination with a related art method which employs variable length coding. For example, where the quantization accuracy is low, that is, where the quantization step number is small, coding is performed by the related art method using a two-dimensional or four-dimensional code train table. Where the quantization accuracy is high, that is, where the quantization step size is large, coding is performed using the method of the present invention taking the scale of the code train table into consideration.

Having now fully described the invention, it will be apparent to one of ordinary skill in the art that many changes and modifications can be made thereto without departing from the spirit and scope of the invention as set forth herein.

TABLE A

| QUANTIZATION ACCURACY INFORMATION CODE | QUANTIZATION STEP NUMBER |
|---|---|
| 000 | 1 |
| 001 | 3 |
| 010 | 5 |
| 011 | 7 |
| 100 | 15 |
| 101 | 31 |
| 110 | 63 |
| 111 | 127 |

TABLE B

| QUANTIZATION ACCURACY INFORMATION CODE | QUANTIZATION STEP NUMBER | QUANTIZATION SPECTRUM | CODE TRAIN | CODE LENGTH |
|---|---|---|---|---|
| 001 | 3 | −1 | 11 | 2 |
|  |  | 0 | 0 | 1 |
|  |  | 1 | 10 | 2 |
| 010 | 5 | −2 | 111 | 3 |
|  |  | −1 | 101 | 3 |
|  |  | 0 | 0 | 1 |
|  |  | 1 | 100 | 3 |
|  |  | 2 | 110 | 3 |
| 011 | 7 | −3 | 1111 | 4 |
|  |  | −2 | 1101 | 4 |
|  |  | −1 | 101 | 3 |
|  |  | 0 | 0 | 1 |
|  |  | 1 | 100 | 3 |
|  |  | 2 | 1100 | 4 |
|  |  | 3 | 1110 | 4 |
| 100 | 15 | −7 | 1111111 | 7 |
|  |  | −6 | 1111101 | 7 |
|  |  | −5 | 111101 | 6 |
|  |  | −4 | 11101 | 5 |
|  |  | −3 | 1101 | 4 |
|  |  | −2 | 101 | 3 |
|  |  | −1 | 011 | 3 |
|  |  | 0 | 00 | 2 |
|  |  | 1 | 010 | 3 |
|  |  | 2 | 100 | 3 |
|  |  | 3 | 1100 | 4 |
|  |  | 4 | 11100 | 5 |
|  |  | 5 | 111100 | 6 |
|  |  | 6 | 1111100 | 7 |
|  |  | 7 | 1111110 | 7 |
| 101 | 31 | −15 | 1111111 | 7 |
|  |  | −14 | 1111101 | 7 |
|  |  | −13 | 1111011 | 7 |
|  |  | −12 | 1111001 | 7 |
|  |  | −11 | 1110111 | 7 |
|  |  | −10 | 1110101 | 7 |
|  |  | −9 | 111001 | 6 |
|  |  | −8 | 110111 | 6 |
|  |  | −7 | 110101 | 6 |
|  |  | −6 | 11001 | 5 |
|  |  | −5 | 10111 | 5 |
|  |  | −4 | 10101 | 5 |
|  |  | −3 | 1001 | 4 |
|  |  | −2 | 0111 | 4 |
|  |  | −1 | 0101 | 4 |
|  |  | 0 | 00 | 2 |
|  |  | 1 | 0100 | 4 |
|  |  | 2 | 0110 | 4 |
|  |  | 3 | 1000 | 4 |
|  |  | 4 | 10100 | 5 |
|  |  | 5 | 10110 | 5 |
|  |  | 6 | 11000 | 5 |
|  |  | 7 | 110100 | 6 |
|  |  | 8 | 110110 | 6 |
|  |  | 9 | 111000 | 6 |

TABLE B-continued

| QUANTIZATION ACCURACY INFORMATION CODE | QUANTIZATION STEP NUMBER | QUANTIZATION SPECTRUM | CODE TRAIN | CODE LENGTH |
|---|---|---|---|---|
| | | 10 | 1110100 | 7 |
| | | 11 | 1110110 | 7 |
| | | 12 | 1111000 | 7 |
| | | 13 | 1111010 | 7 |
| | | 14 | 1111100 | 7 |
| | | 15 | 1111110 | 7 |
| 110 | 63 | −31 | 111111111 | 9 |
| | | −30 | 111111101 | 9 |
| | | −29 | 11111101 | 8 |
| | | −28 | 11111011 | 8 |
| | | −27 | 11111001 | 8 |
| | | −26 | 11110111 | 8 |
| | | −25 | 11110101 | 8 |
| | | −24 | 11110011 | 8 |
| | | −23 | 11110001 | 8 |
| | | −22 | 11101111 | 8 |
| | | −21 | 11101101 | 6 |
| | | −20 | 11101011 | 8 |
| | | −19 | 11101001 | 8 |
| | | −18 | 1110011 | 7 |
| | | −17 | 1110001 | 7 |
| | | −16 | 1101111 | 7 |
| | | −15 | 1101101 | 7 |
| | | −14 | 110101 | 6 |
| | | −13 | 110011 | 6 |
| | | −12 | 110001 | 6 |
| | | −11 | 101111 | 6 |
| | | −10 | 101101 | 6 |
| | | −9 | 101011 | 6 |
| | | −8 | 101001 | 6 |
| | | −7 | 10011 | 5 |
| | | −6 | 10001 | 5 |
| | | −5 | 01111 | 5 |
| | | −4 | 01101 | 5 |
| | | −3 | 01011 | 5 |
| | | −2 | 01001 | 5 |
| | | −1 | 0011 | 4 |
| | | 0 | 000 | 3 |
| | | 1 | 0010 | 4 |
| | | 2 | 01000 | 5 |
| | | 3 | 01010 | 5 |
| | | 4 | 01100 | 5 |
| | | 5 | 01110 | 5 |
| | | 6 | 10000 | 5 |
| | | 7 | 10010 | 5 |
| | | 8 | 101000 | 6 |
| | | 9 | 101010 | 6 |
| | | 10 | 101100 | 6 |
| | | 11 | 101110 | 6 |
| | | 12 | 110000 | 6 |
| | | 13 | 110010 | 6 |
| | | 14 | 110100 | 6 |
| | | 15 | 1101100 | 7 |
| | | 16 | 1101110 | 7 |
| | | 17 | 1110000 | 7 |
| | | 18 | 1110010 | 7 |
| | | 19 | 11101000 | 8 |
| | | 20 | 11101010 | 8 |
| | | 21 | 11101100 | 8 |
| | | 22 | 11101110 | 8 |
| | | 23 | 11110000 | 8 |
| | | 24 | 11110010 | 8 |
| | | 25 | 11110100 | 8 |
| | | 26 | 11110110 | 8 |
| | | 27 | 11111000 | 8 |
| | | 28 | 11111010 | 8 |
| | | 29 | 11111100 | 8 |
| | | 30 | 111111100 | 9 |
| | | 31 | 111111110 | 9 |
| | | −63 | 1111111111 | 10 |
| | | −62 | 1111111101 | 10 |
| | | −61 | 1111111011 | 10 |
| | | −60 | 1111111001 | 10 |
| | | −59 | 111111001 | 9 |
| | | −58 | 111110111 | 9 |
| | | −57 | 111110101 | 9 |
| | | −56 | 111110011 | 9 |
| | | −55 | 111110001 | 9 |
| | | −54 | 111101111 | 9 |
| | | −53 | 111101101 | 9 |
| | | −52 | 111101011 | 9 |
| | | −51 | 111101001 | 9 |
| | | −50 | 1111110111 | 10 |
| | | −49 | 1111110101 | 10 |
| | | −48 | 111100111 | 9 |
| | | −47 | 111100101 | 9 |
| | | −46 | 111100011 | 9 |
| | | −45 | 111100001 | 9 |
| | | −44 | 111011111 | 9 |
| | | −43 | 111011101 | 9 |
| | | −42 | 111011011 | 9 |
| | | −41 | 111011001 | 9 |
| | | −40 | 111010111 | 9 |
| | | −39 | 111010101 | 9 |
| | | −38 | 11101001 | 8 |
| | | −37 | 11100111 | 8 |
| | | −36 | 11100101 | 8 |
| | | −35 | 11100011 | 8 |
| | | −34 | 11100001 | 8 |
| | | −33 | 11011111 | 8 |
| | | −32 | 11011101 | 8 |
| | | −31 | 11011011 | 8 |
| | | −30 | 11011001 | 8 |
| | | −29 | 11010111 | 8 |
| | | −28 | 11010101 | 8 |
| | | −27 | 1101001 | 7 |
| | | −26 | 1100111 | 7 |
| | | −25 | 1100101 | 7 |
| | | −24 | 1100011 | T |
| | | −23 | 1100001 | 7 |
| | | −22 | 1011111 | 7 |
| | | −21 | 1011101 | 7 |
| | | −20 | 1011011 | 7 |
| | | −19 | 1011001 | 7 |
| | | −18 | 1010111 | 7 |
| | | −17 | 1010101 | 7 |
| | | −16 | 1010011 | 7 |
| | | −15 | 1010001 | 7 |
| | | −14 | 100111 | 6 |
| | | −13 | 100101 | 6 |
| | | −12 | 100011 | 6 |
| | | −11 | 100001 | 6 |
| | | −10 | 011111 | 6 |
| | | −9 | 011101 | 6 |
| | | −8 | 011011 | 6 |
| | | −7 | 011001 | 6 |
| | | −6 | 010111 | 6 |
| | | −5 | 010101 | 6 |
| | | −4 | 01001 | 5 |
| | | −3 | 00111 | 5 |
| | | −2 | 00101 | 5 |
| | | −1 | 00011 | 5 |
| | | 0 | 0000 | 4 |
| | | 1 | 00010 | 5 |
| | | 2 | 00100 | 5 |
| | | 3 | 00110 | 5 |
| | | 4 | 01000 | 5 |
| | | 5 | 010100 | 6 |
| | | 6 | 010110 | 6 |
| | | 7 | 011000 | 6 |
| | | 8 | 011010 | 6 |
| | | 9 | 011100 | 6 |
| | | 10 | 011110 | 6 |
| | | 11 | 100000 | 6 |
| | | 12 | 100010 | 6 |
| | | 13 | 100100 | 6 |
| | | 14 | 100110 | 6 |
| | | 15 | 1010000 | 7 |

TABLE B-continued

| QUANTIZATION ACCURACY INFORMATION CODE | QUANTIZATION STEP NUMBER | QUANTIZATION SPECTRUM | CODE TRAIN | CODE LENGTH |
|---|---|---|---|---|
| | | 16 | 1010010 | 7 |
| | | 17 | 1010100 | 7 |
| | | 18 | 1010110 | 7 |
| | | 19 | 1011000 | 7 |
| | | 20 | 1011010 | 7 |
| | | 21 | 1011100 | 7 |
| | | 22 | 1011110 | 7 |
| | | 23 | 1100000 | 7 |
| | | 24 | 1100010 | 7 |
| | | 25 | 1100100 | 7 |
| | | 26 | 1100110 | 7 |
| | | 27 | 1101000 | 7 |
| | | 28 | 11010100 | 8 |
| | | 29 | 11010110 | 8 |
| | | 30 | 11011000 | 8 |
| | | 31 | 11011010 | 8 |
| | | 32 | 11011100 | 8 |
| | | 33 | 11011110 | 8 |
| | | 34 | 11100000 | 8 |
| | | 35 | 11100010 | 8 |
| | | 36 | 11100100 | 8 |
| | | 37 | 11100110 | 8 |
| | | 38 | 11101000 | 8 |
| | | 39 | 111010100 | 9 |
| | | 40 | 111010110 | 9 |
| | | 41 | 111011000 | 9 |
| | | 42 | 111011010 | 9 |
| | | 43 | 111011100 | 9 |
| | | 44 | 111011110 | 9 |
| | | 45 | 111100000 | 9 |
| | | 46 | 111100010 | 9 |
| | | 47 | 111100100 | 9 |
| | | 48 | 111100110 | 9 |
| | | 49 | 1111110100 | 10 |
| | | 50 | 1111110110 | 10 |
| | | 51 | 111101000 | 9 |
| | | 52 | 111101010 | 9 |
| | | 53 | 111101100 | 9 |
| | | 54 | 111101110 | 9 |
| | | 55 | 111110000 | 9 |
| | | 56 | 111110010 | 9 |
| | | 57 | 111110100 | 9 |
| | | 58 | 111110110 | 9 |
| | | 59 | 111111000 | 9 |
| | | 60 | 1111111000 | 10 |
| | | 61 | 1111111010 | 10 |
| | | 62 | 1111111100 | 10 |
| | | 63 | 1111111110 | 10 |

TABLE C

| QUANTIZATION ACCURACY INFORMATION CODE | QUANTIZATION STEP NUMBER | QUANTIZATION SPECTRUM | CODE TRAIN | CODE LENGTH |
|---|---|---|---|---|
| 001 | 3 | −1, −1 | 11111 | 5 |
| | | −1, 0 | 1101 | 4 |
| | | −1, 1 | 1110 | 4 |
| | | 0, −1 | 101 | 3 |
| | | 0, 0 | 0 | 1 |
| | | 0, 1 | 100 | 3 |
| | | 1, −1 | 11101 | 5 |
| | | 1, 0 | 1100 | 4 |
| | | 1, 1 | 11100 | 5 |

What is claimed is:

1. An information coding apparatus wherein a plurality of data are divided into units and the data are transformed into codes of digit data for each of the units, comprising:

a discrimination means for discriminating whether a group of data matches a particular pattern; and a coding means for coding, wherein when the discrimination means discriminates a match, the group of data is coded into a shortest code, but when the discrimination means does not discriminate a match, the group of data is coded into a plurality of corresponding codes and a start bit is appended thereto, wherein the start bit indicates that the group of data has been coded into the plurality of corresponding codes.

2. An information coding apparatus according to claim 1, wherein the particular pattern is a group of pattern data consisting of a plurality of 0's.

3. An information coding apparatus according to claim 2, wherein the shortest code has a length of one bit, and wherein the plurality of corresponding codes and the start bit are arranged into a code train wherein the start bit is arranged at the start of the code train and the plurality of corresponding codes follow.

4. An information coding apparatus according to claim 3, wherein the shortest code is a 0, and wherein the start bit is a 1.

5. An information coding apparatus according to claim 4, wherein the plurality of corresponding codes is a variable length code train.

6. An information coding apparatus according to claim 5, wherein the group of data is obtained by quantization of an acoustic waveform signal or by quantization of spectrum signals obtained by a transformation of an acoustic waveform signal.

7. An information coding method wherein a plurality of data are divided into units and the data are transformed into codes of digit data for each of the units, comprising the steps of:

discriminating whether a group of data matches a predetermined pattern;

coding, when the step of discriminating detects a match, the group of data into a shortest code, but coding, when the step of discriminating does not detect a match, the group of data into a plurality of corresponding codes; and arranging, when the step of discriminating does not detect a match, the plurality of corresponding codes into a code train and appending a start bit thereto, wherein the start bit indicates that the group of data has been coded into the plurality of corresponding codes.

8. An information coding method according to claim 7, wherein the particular pattern is a group of pattern data consisting of a plurality of 0's.

9. An information coding method according to claim 8, wherein in the step of coding, when the step of discriminating detects a match, the shortest code has a length of one bit.

10. An information coding method according to claim 9, wherein the shortest code is a 0, and the start bit is a 1.

11. An information coding apparatus wherein a plurality of data are divided into units and the data are transformed into codes of digit data for each of the units, comprising:

a division means for dividing signals into predetermined coded units;

a decision means for deciding quantization accuracy information for each of the predetermined coded units;

a quantization means for quantizing the signals in response to the quantization accuracy information; and a coding means for coding each signal using a coding method corresponding to the quantization accuracy information; wherein said coding means decomposes the signals into groups and, if the quantization accuracy information is high, codes, when the signals of any group are signals of a particular pattern, the group into a shortest code, but codes, when the signals of the group are any other signals than the signals of the particular pattern, the signals of the group into corresponding code trains and a start bit.

12. An information decoding apparatus which decodes at least one code of digit data received in units of a group into a plurality of data, comprising:

a discrimination means for detecting whether or not the at least one code includes a start bit; and a decoding means for decoding, when the discrimination means does not detect a start bit, the at least one code into a plurality of pieces of information of an equal value, but decoding, when the discrimination means detects a start bit, the at least one code into a plurality of individually corresponding pieces of information.

13. An information decoding apparatus according to claim 12, wherein when the at least one code is a shortest code, the decoding means decodes the shortest code into the plurality of pieces of information of the equal value.

14. An information recording medium, on which codes obtained by coding are recorded, wherein when a plurality of pieces of information in a group are information of a particular pattern, the plurality of pieces of information are recorded into a shortest code representative of the group, but when the plurality of pieces of information in the group are information other than the information of the particular pattern, the plurality of pieces of information are recorded into a code train including a start code different from the shortest code and codes corresponding to the pieces of information of the group.

15. An information coding method wherein a plurality of data are divided into units and the data are transformed into codes of digit data for each of the units, comprising the steps of:

dividing signals into coded units;

deciding quantization accuracy information for each of the coded units;

quantizing each of the signals in response to the quantization accuracy information; and coding, when the signals of any group are signals of a particular pattern, the group into a shortest code, but coding, when the signals of any other group are signals other than the signals of the particular pattern, the signals of the group into individually corresponding codes and appending thereto a start bit which indicates that the signals of the group have been coded into individually corresponding codes.

16. An information decoding method which decodes at least one code of digit data received in units of a group into a plurality of data, comprising the steps of:

discriminating whether or not the at least one code includes a start bit; and decoding, when step of discriminating does not detect a start bit, the at least one code into a plurality of pieces of information having an equal value, but decoding, when the step of discriminating detects a start bit, the at least one code into a plurality of pieces of information having unequal value.

17. An information decoding method according to claim 16, wherein when the step of discriminating does not detect a start code, the at least one code comprises a shortest code representing the group.

18. An information coding apparatus wherein a plurality of data are divided into units and the data are transformed into codes of digit data for each of the units, comprising:

a discrimination circuit configured to discriminating whether a group of data matches a particular pattern; and a coding circuit operationally coupled with the discrimination circuit and configured so that when the discrimination circuit discriminates a match, the group of data is coded into a shortest code, but when the discrimination circuit does not discriminate a match, the group of data is coded into a plurality of corresponding codes and a start bit is appended thereto, wherein the start bit indicates that the group of data has been coded into the plurality of corresponding codes.

19. An information coding apparatus according to claim 18, wherein the particular pattern is a group of pattern data consisting of a plurality of 0's.

20. An information coding apparatus according to claim 19, wherein the shortest code has a length of one bit, and wherein the plurality of corresponding codes and the start bit are arranged into a code train wherein the start bit is arranged at the start of the code train and the plurality of corresponding codes follow.

21. An information coding apparatus according to claim 20, wherein the shortest code is a 0, and wherein the start bit is a 1.

22. An information coding apparatus according to claim 21, wherein the plurality of corresponding codes is a variable length code train.

23. An information coding apparatus according to claim 22, wherein the group of data is obtained by quantization of an acoustic waveform signal or by quantization of spectrum signals obtained by a transformation of an acoustic waveform signal.

24. An information coding apparatus wherein a plurality of data are divided into units and the data are transformed into codes of digit data for each of the units, comprising:

a division circuit configured to divide signals into predetermined coded units;

a decision circuit operationally coupled with the division circuit and configured to decide quantization accuracy information for each of the predetermined coded units;

a quantization circuit operationally coupled with the decision circuit and configured to quantize the signals in response to the quantization accuracy information; and a coding circuit operationally coupled with the quantization circuit and configured to code each signal using a coding method corresponding to the quantization accuracy information; wherein the coding circuit decomposes the signals into groups and, if the quantization accuracy information is high, codes, when the signals of any group are signals of a particular pattern, the group into a shortest code, but codes, when the signals of the group are any other signals than the signals of the particular pattern, the signals of the group into corresponding code trains and a start bit.

25. An information decoding apparatus which decodes at least one code of digit data received in units of a group into a plurality of data, comprising:

a discrimination circuit configured to detect whether or not the at least one code includes a start bit; and a decoding circuit operationally coupled with the discrimination circuit and configured to decode, when the discrimination means does not detect a start bit, the at least one code into a plurality of pieces of information of an equal value, but to decode, when the discrimination means detects a start bit, the at least one code into a plurality of individually corresponding pieces of information.

26. An information decoding apparatus according to claim 25, wherein when the at least one code is a shortest code, the decoding circuit decodes the shortest code into the plurality of pieces of information of the equal value.

* * * * *